(12) United States Patent  (10) Patent No.: US 9,111,551 B2
Seigler et al.  (45) Date of Patent: Aug. 18, 2015

(54) RECORDING HEAD STRUCTURE

(71) Applicant: Seagate Technology LLC, Cupertino, CA (US)

(72) Inventors: Michael Seigler, Eden Prairie, MN (US); Neil Zuckerman, Eden Prairie, MN (US); Chris Rea, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/092,675

(22) Filed: Nov. 27, 2013

(65) Prior Publication Data

US 2015/0146505 A1  May 28, 2015

(51) Int. Cl.
| | |
|---|---|
| G11B 5/02 | (2006.01) |
| G11B 21/02 | (2006.01) |
| G11B 5/127 | (2006.01) |
| G11B 5/115 | (2006.01) |
| G11B 5/40 | (2006.01) |
| G11B 7/1387 | (2012.01) |
| G11B 5/60 | (2006.01) |
| G11B 13/08 | (2006.01) |
| G11B 5/00 | (2006.01) |

(52) U.S. Cl.
CPC *G11B 5/115* (2013.01); *G11B 5/40* (2013.01); *G11B 5/607* (2013.01); *G11B 7/1387* (2013.01); *G11B 5/127* (2013.01); *G11B 5/6088* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,509,728 B1 | 3/2009 | Schreck et al. | |
| 8,077,418 B1 | 12/2011 | Hu et al. | |
| 8,208,350 B1 | 6/2012 | Hu et al. | |
| 8,259,540 B1 | 9/2012 | Sahoo et al. | |
| 8,385,158 B1 | 2/2013 | Hu et al. | |
| 8,406,092 B2 | 3/2013 | Tomikawa et al. | |
| 8,416,650 B2 * | 4/2013 | Mori et al. | 369/13.33 |
| 2011/0128828 A1 | 6/2011 | Naniwa et al. | |
| 2011/0235480 A1 | 9/2011 | Goulakov et al. | |
| 2011/0299367 A1 | 12/2011 | Naniwa et al. | |
| 2013/0170060 A1 * | 7/2013 | Johns et al. | 360/31 |

* cited by examiner

*Primary Examiner* — Andrew L Sniezek
(74) *Attorney, Agent, or Firm* — HolzerIPLaw, PC

(57) ABSTRACT

Implementations disclosed herein provide a transducer head including a writer feature extending to a transducer head surface, the transducer head surface being configured to face a storage medium surface; and a bumper structure configured on the transducer head surface, the bumper structure configured to be proximal to the writer feature and to protrude beyond the writer feature in response to energy.

20 Claims, 6 Drawing Sheets

RECORDING HEAD STRUCTURE

SUMMARY

Implementations disclosed herein provide a transducer head including a writer feature extending to a transducer head surface, the transducer head surface being configured to face a storage medium surface; and a bumper structure configured on the transducer head surface, the bumper structure configured to be proximal to the writer feature and to protrude beyond the writer feature in response to energy.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

DETAILED DESCRIPTIONS

Heat assisted magnetic recording (HAMR) generally refers to the concept of locally heating a recording medium to reduce the coercivity of the medium. Such reduced coercivity allows the applied magnetic writing fields to more easily direct the magnetization within the recording medium during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the Hc or coercivity is reduced such that the magnetic write field is sufficient to write to the media. Once the media cools to ambient temperature, the coercivity has a sufficiently high value to assure thermal stability of the recorded information.

Methods of heat-assisted magnetic recording (HAMR) include locally heating the media using the fringing electrical fields from optical frequency surface plasmons generated by a Near-Field Transducer (NFT). Recording head including HAMR include a NFT in proximity to the writer elements of the recording head in order to improve areal density performance of the recording device. However, the proximity of the NFT to the writer element may result in loss of reliability for the recording head. Specifically, as the NFT is located on a surface facing the recording media, the NFT may be damaged when it hits the media, due to asperities on the media. If the NFT hits the media, it causes wear on the head overcoat near the NFT, and may also cause undesirable heating. This may result in deformation of the NFT, exposure of corrosion-sensitive materials such as the write pole, and other events that can lead to failure of the recording head.

To prevent the damage to the NFT resulting from such thermal asperities, an implementation disclosed herein provides a transducer head including a protective structure in front of the NFT in the up-track direction. Specifically, implementations of recording head provided herein provide a transducer head including a writer feature extending to a transducer head surface, the transducer head surface being configured to face a storage medium surface and a bumper structure configured on the transducer head surface, the bumper structure configured to be proximal to the writer feature and to protrude beyond the writer feature in response to energy. In an implementation of the transducer head, the size of the bumper structure is controlled by a energy source such as a thermal energy source, an optical energy source, etc.

Figure 1:
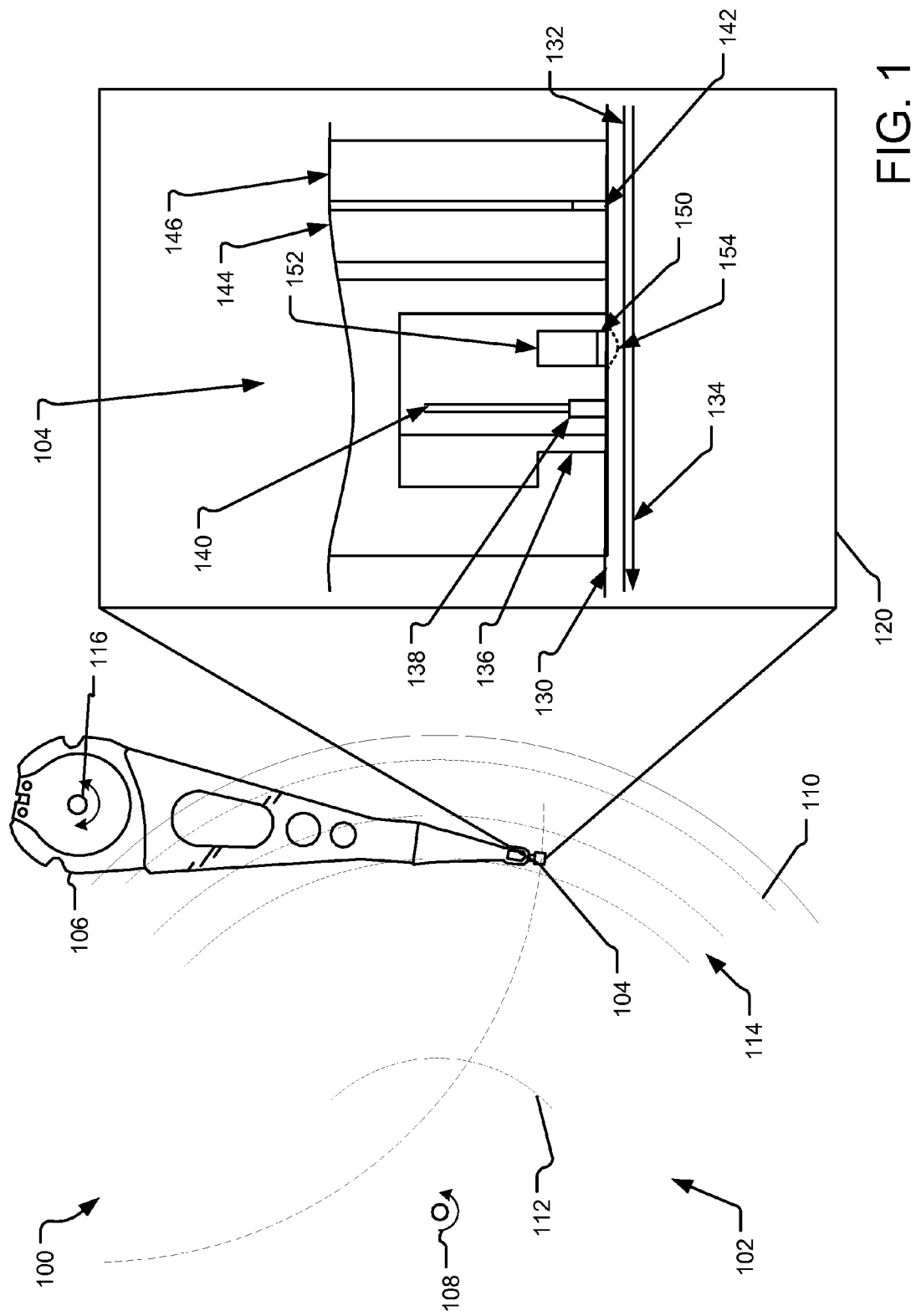
FIG. 1 illustrates an example schematic block diagram illustrating an example write pole structure implemented on an end of an actuator assembly.

FIG. 1 illustrates a schematic block diagram 100 illustrating an example recording head structure implemented on an end of an actuator assembly. Specifically, FIG. 1 illustrates a plan view of an implementation of a disc 102 with a transducer head 104 situated on an end of an actuator assembly 106. Disc 102 rotates about a disc axis of rotation 108 during operation. Further, disc 102 includes an outer diameter 110 and inner diameter 112 between which are a number of data tracks 114, illustrated by circular dotted lines. Data tracks 114 are substantially circular and are made up of bits of information.

Information may be written to and read from the patterned bits on the data tracks 114 through the use of the actuator assembly 106, which rotates during a data track 114 seek operation about an actuator axis of rotation 116 positioned adjacent the disc 102. The transducer head 104, mounted on the actuator assembly 106 at an end distal from the actuator axis of rotation 116, flies in close proximity above the surface of the disc 102 during disc operation. The transducer head 104 includes recording head including a read sensor for reading data from the track 114 and a write pole for writing data to the track 114.

An implementation of the transducer head 104 includes a writer feature that extends to a transducer head surface, also referred to as an air-bearing surface (ABS). The transducer head surface is configured to face a storage medium surface. The transducer head also includes a bumper structure configured on the transducer head surface, wherein the bumper structure is configured to be proximal to the writer feature and to protrude beyond the writer feature in response to energy, such as thermal energy, optical energy, etc.

FIG. 1 also illustrates an expanded view of a partial cross-sectional configuration 120 (not to scale) of the transducer head 104. The configuration 120 illustrates a side view of a transducer head 104 with an ABS 130 of the transducer head 104 facing media 132. In the illustrated implementation, the media 132 moves to the left, in the direction 134, as the disc rotates around its central axis. The transducer head 104 includes a write pole 136 that is configured to write information to the media 132. For example, a coil structure (not shown) may be provided to carry a current and the generating a flux in the write pole 136. The flux flows through the write pole 136, a portion of the media 132 adjacent the write pole 136 and a return pole (not shown) that may be located up-track from the write pole 136. The transducer head 104 also includes a magnetoresistive (MR) sensor 142 located up-track from the write pole 136. The MR sensor 142 may be configured between a bottom shield 146 and a top shield 144.

The transducer head 104 may also include a number of other features that are not disclosed in the implementation illustrated in FIG. 1.

In one implementation, the transducer head 104 also includes a near field transducer (NFT) structure 138. The NFT 138 is configured to receive optical energy from a waveguide 140 and convert the optical energy to heat energy. The NFT 138 is configured on the transducer head 104 to be in front of the write pole 136 along a down-track direction. In other words, as the media 132 moves in the direction 134, a given point on the media 132 faces the NFT 138 before is faces the write pole 136. The NFT 136 heats the media point to reduce its coercivity to facilitate more efficient writing of information by the write pole 136. For example, the NFT 138 may heat a media point above its Curie point to reduce its coercivity to zero. As a result, the write pole 136 is able to write information to the heated section of the media 132 with higher efficiency. Such heating of the media using the NFT 138 is known as heat assisted magnetic recording (HAMR).

In one implementation, the NFT 138 is made of a material that efficiently converts the optical energy to heat energy. For example, gold (Au) may be used as an NFT material. However, gold is a soft material and is susceptible to damage due to friction, bumping into the media 132, etc. Furthermore, the surface of the media 132 may be rough and uneven, resulting in the likelihood that as the transducer head 104 is moves over the media 132 the NFT 138 may bump into the surface of the media 132. For example, the media 132 may have roughness (asperity) due to the growth and fabrication processes used to fabricate the film.

In one implementation of the transducer head 104 using HAMR, the transducer head 104 has the NFT 138 as the close point in order to get higher areal density performance. The close point refers to the lowest or closest position of the transducer head 104 relative to the surface of the media 132. However, setting the NFT 138 as the close point of the transducer head 104 may result in decreased reliability due to the likelihood of the NFT 138 being damaged when it hits surface of the media 132. For example, when the NFT 138 hits the media 132, it heats up and accelerates various failure modes of the transducer head 104, such as peg agglomeration, pole corrosion, etc. Such increase in the failure mode further accelerates the wear of the HOC over the NFT 138 and the write pole 136, further degrading the long-term reliability of the transducer head 104.

To prevent such damage to the NFT 138 and the write pole 136 region, the transducer head 104 is configured to include a bumper structure 150 proximal to the NFT 138 and the write pole 136 such that the bumper structure 150 protrudes beyond the NFT 138 and/or the write pole 136. For example, the bumper structure 150 may be configured to receive energy from an energy source 152 and in response to the energy generate a protrusion 154 causing the bumper structure 150 to protrude beyond the NFT 138 towards the media 132. Thus, the bumper structure 150 and the protrusion 154 prevent the NFT 138 from hitting the media 132. The energy source 152 may be an optical energy source, and electric energy source, etc. The bumper structure 150 may be configured to generate heat in response to the energy to generate the protrusion 154, to control the size of the protrusion 154, etc.

Figure 2:
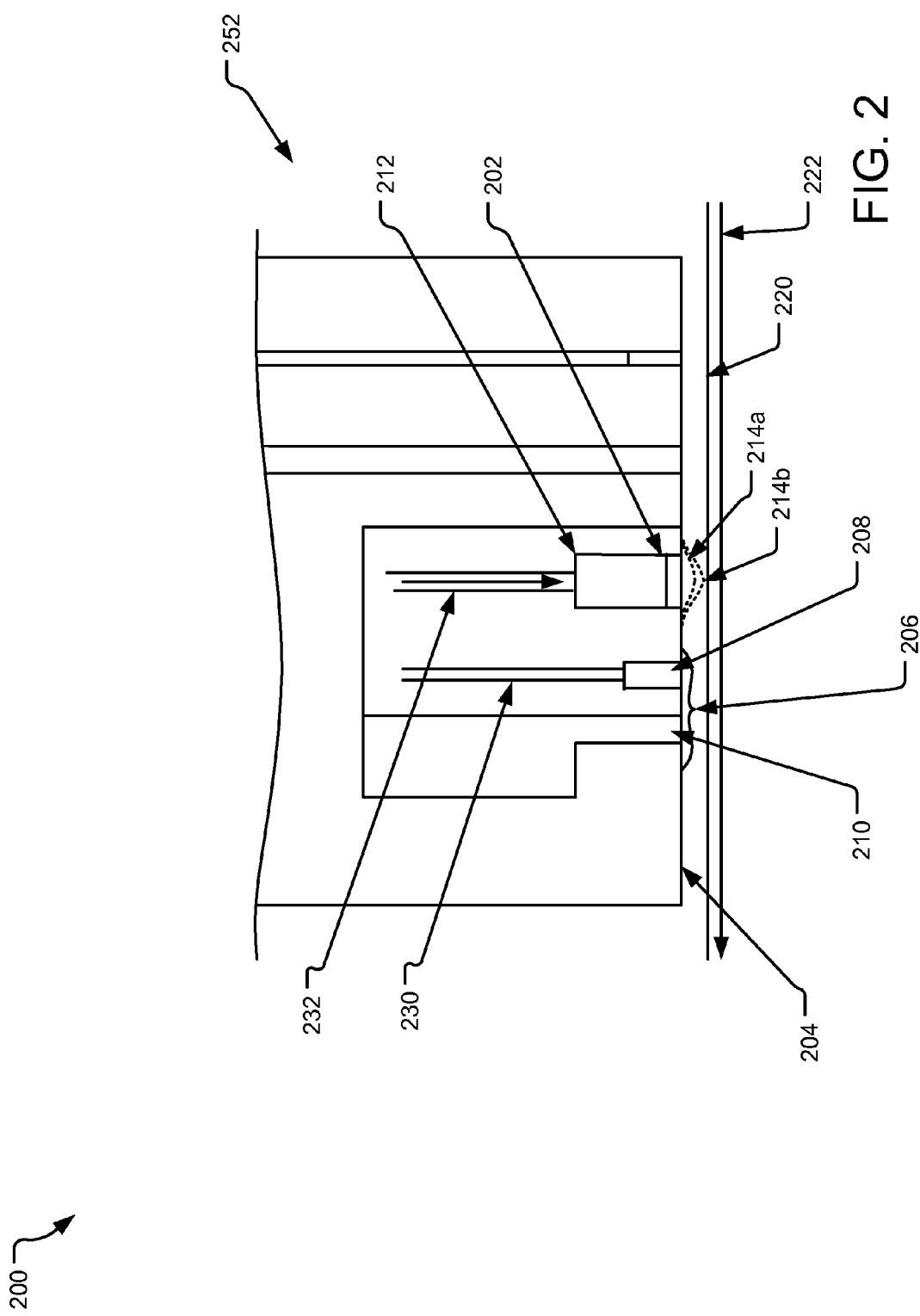
FIG. 2 illustrates and example block diagrams of two partial cross-sectional configurations of a recording heads.

FIG. 2 illustrates an implementation of a transducer head 200 including a bumper structure 202 configured on the transducer head surface 204. The bumper structure 202 is configured proximal to a writer feature 206 including an NFT 208 and a write pole 210. The bumper structure 202 is adjacent to an energy source 212 that can be used to control the level of protrusion of the bumper structure 202 towards a media surface 220. The media rotates such that the media surface 220 moves in the direction 222. Thus, the bumper structure 202 is located up-track from the writer feature 206.

The material of the bumper structure 202 may be wear resistant such that when it comes in contact with the media surface, it does not suffer substantial damage. Alternatively, the material used to create the bumper structure 202 may be corrosion resistant and galvanically compatible with the material of the transducer head 200 at the air-bearing surface where the bumper structure 202 is configured. The bumper structure 202 may also be created in the form of a coating onto a protruding structure (not shown) at the air-bearing surface of the transducer head 200 where the protruding structure expands when heat is provided to the protruding structure. Thus, the bumper structure 202 is configured to generate a localized expansion towards the media 220.

The bumper structure 202 is configured such that when it receives energy from an energy source 212, it generates a protrusion 214. Specifically, the amount of protrusion 214 is dependent on the level of energy provided by the energy source 212. For example, at a lower energy level the protrusion 212 may be as shown by 214a, which can be increased to 214b with a higher energy level. The level of protrusion 214a, 214b determines the protection afforded by the bumper structure 202 to the writer feature 206. In one implementation, the level of energy provided by the energy source 212 is controlled based on the desired close point of the transducer head 200.

The NFT 208 may be an optical NFT that converts optical energy received from a waveguide 230 to heat energy. Alternatively, other types of NFT structure may be provided. The energy source 212 may be configured to receive electrical energy via electrical connection 232. However, in an alternative implementation, the energy from the waveguide 230 may be coupled to the energy source 212. The adjusting of the close point of the transducer head 200 using the bumper structure 202 is further illustrated below in FIG. 4.

While the bumper structure 202 is illustrated as being apart from other components of the transducer head 200, such as a leading return pole 230 or a read sensor structure 232, in an alternative implementation, the bumper structure 202 may be created at the air-bearing surface end 234 of the leading return pole 230, the air-bearing surface end 236 of a read sensor structure 232, etc. For example, a coating of material may be provided at the air-bearing surface end 234 of the leading return pole 230 that expands when heat energy is provided to the leading return pole 230 to cause a protrusion that protects the NFT 208 from hitting the media surface 220.

Figure 3:
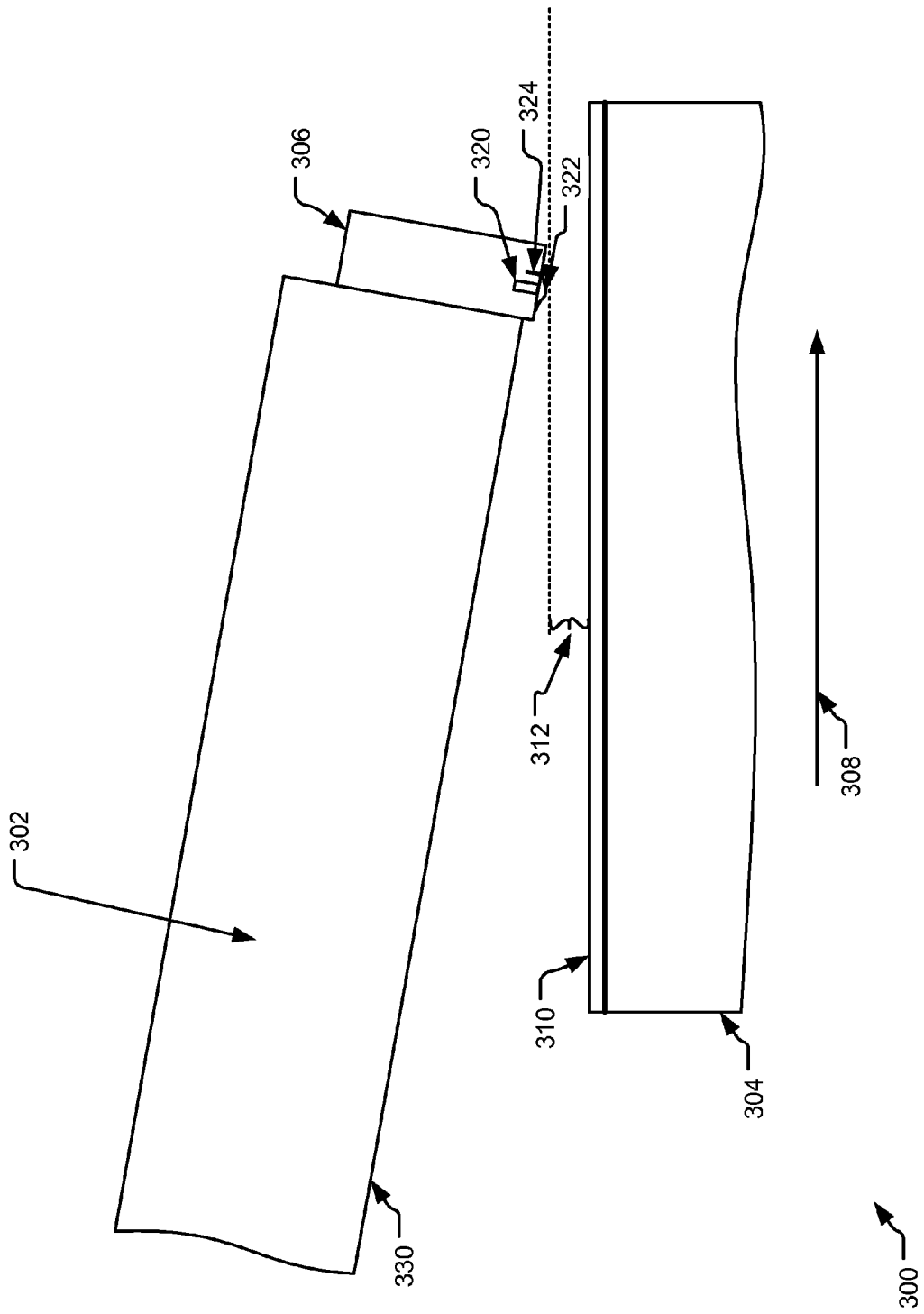
FIG. 3 illustrates an example side view of a slider configuration including a transducer head with a bumper structure disclosed herein.

FIG. 3 illustrates a side view of a slider configuration 300 including a transducer head with a bumper structure disclosed herein. Specifically, FIG. 3 illustrates a partial view of a slider 302 in vicinity of a media 304, such as a magnetic media, etc. A transducer head 306 is attached at an end of the slider 302. The media 304 moves in a direction 308 and it has a media surface 310 facing a slider air-bearing surface 330. A clearance 312 is the close point distance between the transducer head 306 and the media surface 310. The transducer head 306 includes a number of reader and writer components (not all shown here). The illustrated implementation of the transducer head 306 includes a bumper structure 320 in up-track direction from an NFT 324. The bumper structure 320 is configured to receive energy, such as electrical energy, and cause a protrusion (or bumper) 322 to be generated on the transducer head 306 surface facing the media surface 310. The protrusion 322 protects the NFT 324 from hitting any asperities (roughness) on the media surface 310.

Figure 4:
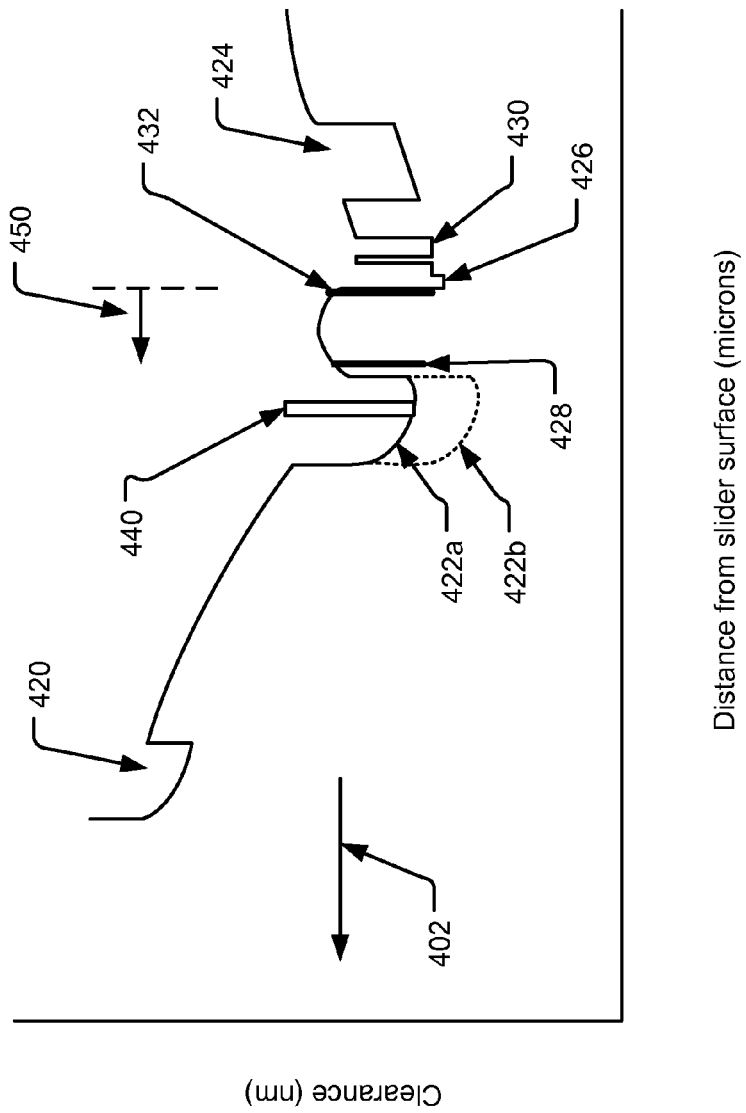
FIG. 4 illustrates an example trailing edge (TE) profile of air-bearing surface of a transducer head.

FIG. 4 illustrates a down-track profile of the air bearing surface of the transducer section of a recording head 400, where heat from a writer heater actuates a bumper structure 440. Specifically, the TE profile illustrates the clearance of one or more components on the surface of a transducer from a media surface on the Y-axis as a function of the distance of such component from a slider surface on which the transducer is mounted. The transducer head 400 is illustrated to have the transducer head moving in the direction 402 over a media surface.

The transducer head 400 includes a read sensor structure 420, a leading return pole (RP) 422, a trailing RP 424, and a write pole 426. An asperity detecting structure 428, such as a thermal asperity detector, to determine the asperity of the media surface may be provided in front of the write pole 426 in the up-track direction. Furthermore, a contact structure, such as a contact pad, may be provided in any position on the transducer head 400 as long as they are at the close point of the transducer head 400. The transducer head 400 also includes an NFT 432 that assists the write pole 426 with heat assisted magnetic recording.

A bumper structure 440 may be provided on the transducer head up-track from the write pole 426. Specifically, the bumper structure 440 may be provided at any location up-track from the write pole 426, as illustrated by 450. In the illustrated implementation, the bumper structure 440 is provided in the leading RP 422. The bumper structure 440 may be configured to receive energy, such as electrical energy, from an energy source and to cause the leading RP 422 to protrude towards the media surface. For example, applying energy to the bumper structure 440 may cause the leading RP 422 to protrude from a first position 422a to a second position 422b.

As shown in FIG. 4, before the protrusion, the clearance of the write pole 426 (distance between the write pole 426 and a media surface) is smaller than the clearance for the leading RP 422. As a result, asperities in the media may cause the write pole to hit the media surface. Furthermore, given that the NFT 432 is in the up-track direction from the write pole 426, such asperities may hit the NFT 432 and cause damage to the NFT 432. On the other hand, when the leading RP 422 is in the protruded position 422b, the clearance of the leading RP 422 is lower than the clearance of the NFT 432 and the write pole 426. As a result, any roughness in the media surface is likely to hit the leading RP 422 in the protruded position 422b before hitting the NFT 432 or the write pole 426.

Thus, the bumper structure 440 may be used to control the clearance of a surface up-track from the NFT 432 and the write pole 426 to protect the NFT 432 and the write pole 426 from damage resulting from hitting media surface. While the example illustrated in FIG. 4 is shown to have the bumper structure 440 in the leading RP 422, in an alternative implementation (not shown) the bumper structure 400 may be located at other up-track location, such as with the read sensor 420. In other implementations, a tunable bumper may be placed in other locations proximate to the NFT 432 and/or write pole 426, such as lateral to, or down-track of, these features In one implementation, the bumper structure 440 is composed from at least one of a magnetic material connected to a leading return pole, an optical material, a refractory material, or a combination thereof. If the bumper structure 440 is composed of a magnetic material connected to a return pole, this results in improved efficiency of the write pole due to increased saturation response of the write pole and better head field angle at transition locations. If the bumper structure 440 is composed of a less lossy optical material, such as AlO, TaO, TiO, SiO2, SiN, In Sn O, $MgAl_2O_4$, $Y_2O_3$, $V_2O_5$, or similar materials, organics such as PMMA, PMGI (photoresist), etc., then the bumper structure 440 may be located closer to an optical core of the transducer head 400. On the other hand, if the bumper structure 440 is made of a refractory material, such as Ru, NiRu, Ta, Cr, NiCr, NiW, NiCu CoFeO, CoNiRe, NiRe or similar binary and ternary alloys, etc., the protrusion generated by the bumper structure at the air-bearing surface is generally higher than that resulting from a bumper structure 440 using optical or magnetic material.

In an alternative implementation, a combination of one or more of the above materials may be used to increase contact area of the bumper structure 440 and to improve its magnetic efficiency without increased optical losses. For example, the bumper structure 440 may be composed from a Ta layer of approximately less than 50 nm (to reduce magnetic loss), a magnetic layer of approximately 50 to 500 nm, and an optical layer of approximately 100 nm. In such a configuration, the magnetic layer may be separated from the Ta layer with a thin-film insulator and carry and electrical current to provide a signal contact and the signal in turn could be used to tune the bias between a reader heater (not shown) and a writer heater (not shown) to optimize the contact for the configuration.

Figure 5:
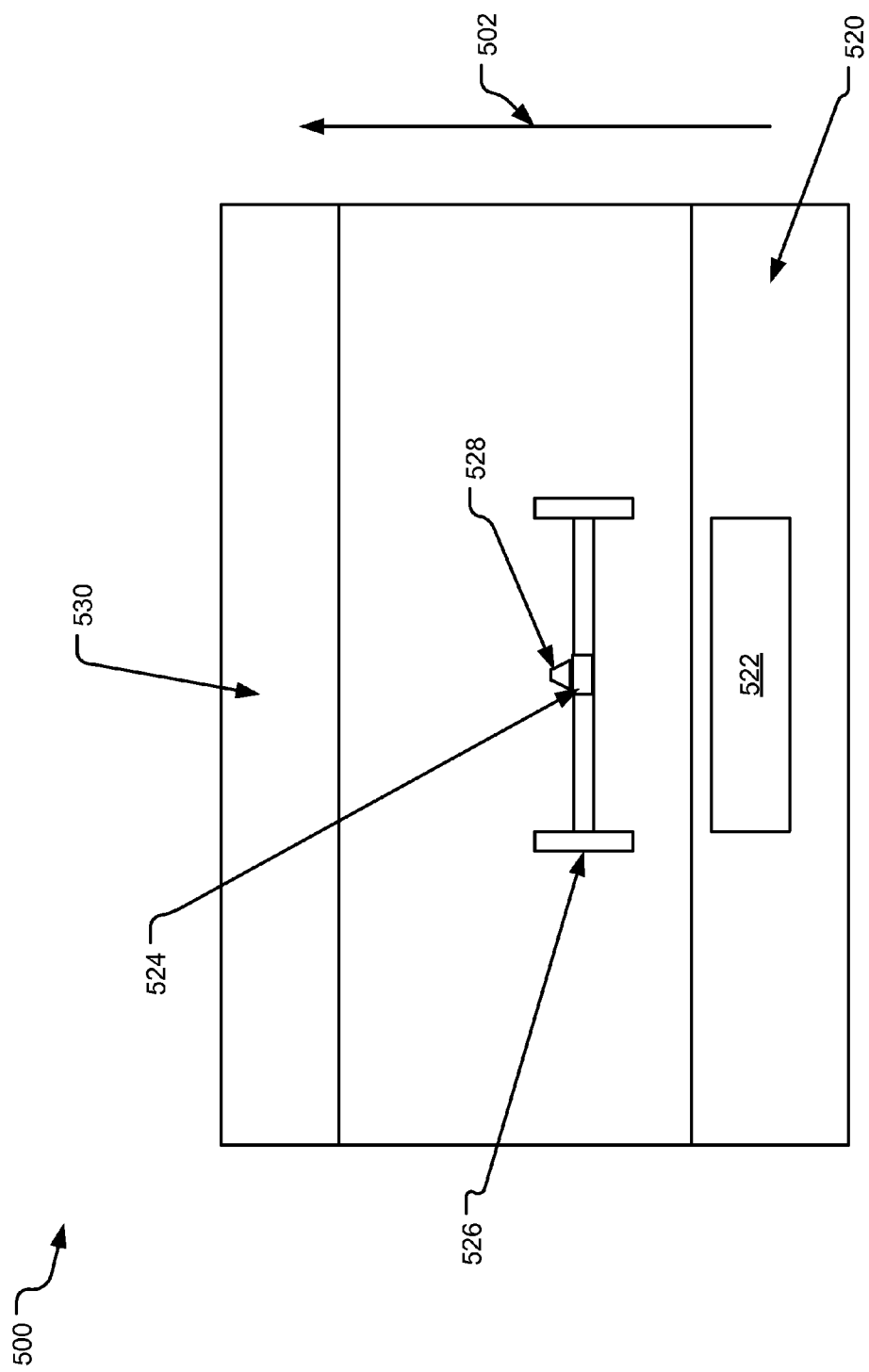
FIG. 5 illustrates an example air-bearing surface view of a transducer including a bumper structure disclosed herein.

FIG. 5 illustrates an example air-bearing surface view of a partial transducer 500 including bumper structure disclosed herein. Specifically, the transducer 500 is illustrated to move in the down-track direction 502 across a media surface. The transducer 500 includes a leading edge return pole (RP) 520 that may be configured to also include a bumper structure 522. Thus the bumper structure 522 is configured up-track from an NFT 524 of the transducer 500. The transducer 500 also includes a solid immersion mirror (SIM) 526 is used to focus optical energy on the transducer 524. A write pole 528 is located substantially adjacent to the NFT 524. The leading edge RP 520 may be connected by a yoke (not shown) to a trailing edge RP 530. The distance between the bumper structure 522 and the NFT 524 may be, for example, approximately one micron. If the bumper structure 522 needs to be closer to the NFT 524, for example at approximately 0.5 micron, the bumper structure 522 may be brought within the SIM 526 (not shown).

A heater (not shown) may be used to actuate the bumper structure 522. For example, a heater in write mode is positioned close to the bumper structure 522 and activated by a controllable electric current. The heater may be configured such that the constricted high heat generation portions of the heater match the contours of the leading edge RP 520. In one implementation, the local constriction of the heater is designed to preferentially protrude the center of the regions of the bumper structure 522 near the air-bearing surface of the transducer head 500.

Figure 6:
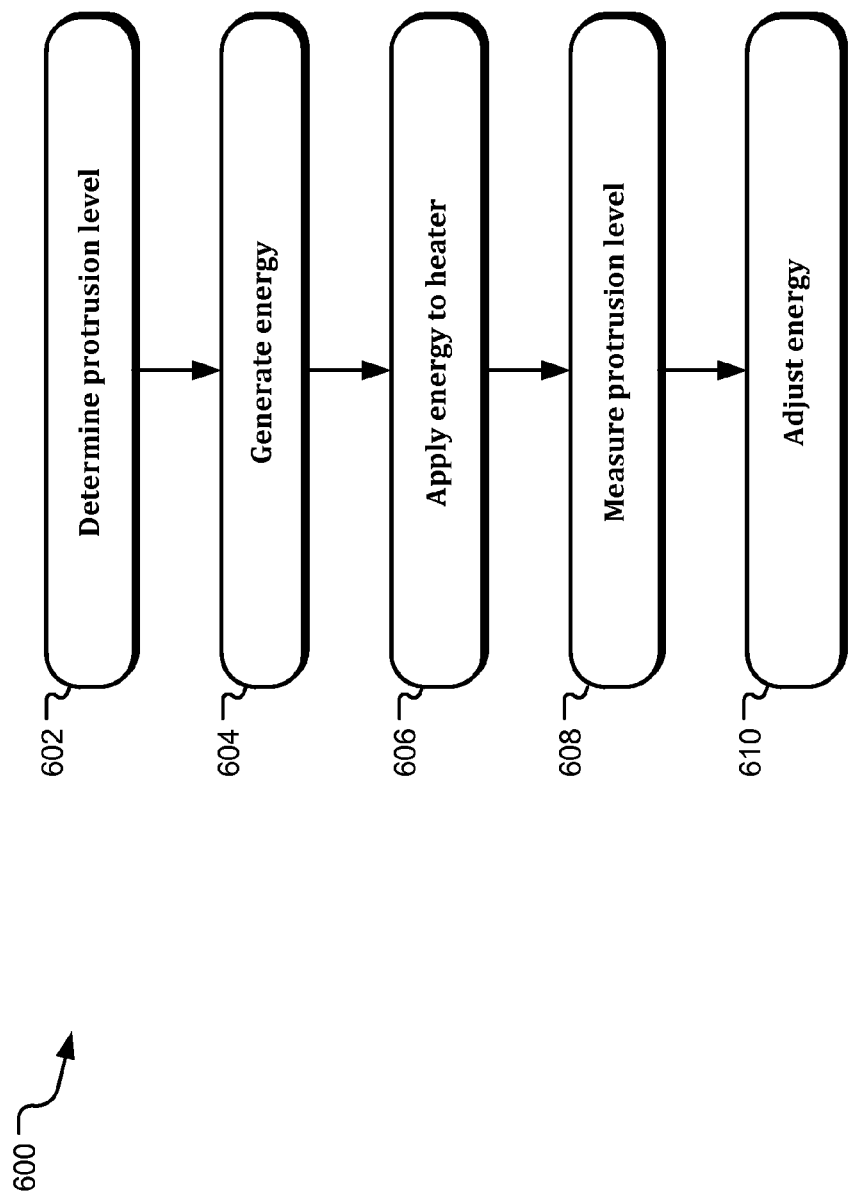
FIG. 6 illustrates an example flowchart for using the bumper structure disclosed herein.

FIG. 6 illustrates an example flowchart 600 for using the bumper structure disclosed herein. An operation 602 determines the desired level of protrusion to be generated by the bumper structure. An operation 604 generates energy, such as an electric current, an optical light, etc., that is based on the desired level of protrusion. An operation 606 applies the energy to the bumper structure. As a result, the bumper structure may generate a protrusion in the direction of the media. An operation 608 measures the level of protrusion, for example, using a thermal asperity detector (TAD). An operation 610 adjusts the energy applied to the bumper structure based on the detected protrusion levels. For example, a controller connected to the asperity detector may determine a clearance level for the bumper structure based on the level of protrusion and change the amount of electrical energy applied to the bumper structure.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A transducer head comprising:
a writer feature, the writer feature including a near-field transducer (NFT) and a write pole, extending to a transducer head surface, the transducer head surface being configured to face a storage medium surface having tracks thereon; and
a bumper structure configured on the transducer head surface, the bumper structure configured to be proximal to the writer feature and to protrude beyond the writer feature in response to energy, wherein the bumper structure is positioned between the writer feature and a leading edge of the transducer head surface, without overlapping the writer feature wherein the leading edge is furthest up-track with respect to a movement direction of the storage medium surface.

2. The transducer head of claim 1, wherein the bumper structure is further configured to protrude beyond the writer feature in response to thermal energy.

3. The transducer head of claim 1, wherein the bumper structure is further configured to protrude beyond the writer feature in response to optical energy.

4. The transducer head of claim 1, wherein the bumper structure is configured to be adjacent to the writer feature.

5. The transducer head of claim 1, wherein the writer feature includes a magnetic write pole.

6. The transducer head of claim 1, wherein the bumper feature is further configured to protrude beyond the writer feature towards the storage medium surface.

7. The transducer head of claim 1, wherein the NFT is positioned in proximity of the bumper structure.

8. The transducer head of claim 1, further comprising a heater structure configured to be heated using electrical current.

9. The transducer head of claim 1, wherein the bumper structure is composed of magnetic material connected to a return pole of the transducer head.

10. The transducer head of claim 1, wherein the bumper structure is composed of a magnetic material connected to a leading return pole.

11. The transducer head of claim 1, wherein the bumper structure is composed of an optical material including at least one of AlO, TaO, TiO, SiO2, and SiN.

12. The transducer head of claim 1, wherein the bumper structure is composed of a refractory material including at least one of Ru, NiRu, Ta, NiCr, NiW, NiCu, CoFeO, CoNiRe, and Cr.

13. A device, comprising:
a bumper structure configured on a transducer head surface adjacent a storage medium having tracks thereon, the bumper structure configured to be up-track from a writer feature, including a near-field transducer and write pole, and to protrude beyond the writer feature in response to energy, wherein the bumper structure is positioned between the writer feature and a leading edge of the transducer head surface, without overlapping the writer feature wherein the leading edge is furthest up-track with respect to a movement direction of the storage medium.

14. The device of claim 13, further comprising a heater structure positioned adjacent to the bumper structure and configured to receive electrical energy to generate heat.

15. The device of claim 13, wherein the bumper structure is composed of a combination of a magnetic material connected to a leading return pole, an optical material, and a refractory material.

16. The device of claim 15, wherein the magnetic material is connected to a leading return pole and separated from the refractory material with a thin-film insulator.

17. The device of claim 13, wherein the bumper structure is composed of at least one of magnetic metal, a non-magnetic metal, and a dielectric material.

18. A device, comprising:
a writer feature configured on a transducer adjacent a storage medium having tracks thereon, the writer feature including a write pole and a near field transducer (NFT) proximal to the write pole;
a bumper structure configured to generate a protrusion towards the storage medium in response to receiving electrical energy, the bumper structure located up-track from the NFT and between the NFT and a leading edge of a transducer, without overlapping the writer feature, wherein the leading edge is furthest up-track with respect to a movement direction of the storage medium; and
an asperity detector configured to determine clearance between the bumper structure and the storage medium.

19. The device of claim 18, further comprising a controller configured to receive the clearance level from the asperity detector and adjust a level of energy applied to the bumper structure.

20. The device of claim 19, wherein controller is further configured to adjust a level of electric current applied to the bumper structure.

* * * * *